(12) United States Patent
Zimmer

(10) Patent No.: US 7,581,278 B2
(45) Date of Patent: Sep. 1, 2009

(54) WINDOW-WIPING DEVICE, PARTICULARLY FOR A MOTOR VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 689 days.

(21) Appl. No.: 10/536,059

(22) PCT Filed: May 30, 2003

(86) PCT No.: PCT/DE03/01765

§ 371 (c)(1),
(2), (4) Date: May 24, 2005

(87) PCT Pub. No.: WO2004/050439

PCT Pub. Date: Jun. 17, 2004

(65) Prior Publication Data

US 2006/0162113 A1  Jul. 27, 2006

(30) Foreign Application Priority Data

Nov. 29, 2002 (DE) ............................... 102 55 774

(51) Int. Cl.
*B60S 1/16* (2006.01)
*B60S 1/18* (2006.01)
*B60S 1/34* (2006.01)

(52) U.S. Cl. ............... 15/250.31; 15/250.3; 403/DIG. 3

(58) Field of Classification Search ................. 15/250.3, 15/250.31, 250.19, 250.34; 384/226; 403/DIG. 3, 403/2

See application file for complete search history.

(56) References Cited

U.S. PATENT DOCUMENTS

| 6,513,186 | B1* | 2/2003 | Zimmer ................... 15/250.31 |
| 2001/0001336 | A1* | 5/2001 | Kobayashi et al. ......... 15/250.3 |
| 2002/0073501 | A1* | 6/2002 | Perin et al. ................. 15/250.3 |

FOREIGN PATENT DOCUMENTS

| DE | 44 13 635 | 10/1995 |
| DE | 198 51 881 | 5/1999 |
| DE | 199 03 140 | 8/1999 |
| EP | 0 806 329 | 11/1997 |
| EP | 1033295 A2 | 9/2000 |
| EP | 1 074 442 | 2/2001 |
| FR | 2 749 243 | 12/1997 |
| GB | 2 347 340 | 9/2000 |
| JP | 9-24800 | 1/1997 |
| WO | WO 99/39945 | 8/1999 |

\* cited by examiner

*Primary Examiner*—Gary K Graham
(74) *Attorney, Agent, or Firm*—Michael Best & Friedrich LLP

(57) ABSTRACT

A windshield wiper device (10), in particular for a motor vehicle, is proposed, with at least one wiper bearing (14), which includes a bearing housing (24), [and] a wiper shaft (22), which is positioned in the bearing housing (24) and bears a wiper arm (28) on a first end (26). An element (42), which axially fixes the wiper shaft (22), is radially attachable to the wiper shaft (22).

19 Claims, 4 Drawing Sheets

WINDOW-WIPING DEVICE, PARTICULARLY FOR A MOTOR VEHICLE

BACKGROUND

The invention relates to a windshield wiper device for a motor vehicle.

Numerous windshield wiper devices, which feature a wiper bearing that includes at least one bearing housing in which a wiper shaft is positioned, which is axially fixed by means of an element and bears a wiper arm on a first end, are already known, e.g., from DE 199 03 140 A1. In this connection, the axial fixation is embodied in such a way that the element is deformed with the effect of force on the wiper arm or on the first end of the wiper shaft under the absorption of energy. If a pedestrian now impacts the wiper arm or the wiper shaft in the case of an accident, these are able to recede, which can result in a lesser injury to the pedestrian. The fact that the element absorbs energy also prevents the pedestrian from impacting the vehicle body with the full energy because of the receding of the wiper arms. For this reason, the elements are embodied as thin-walled, plate-shaped sheet metal sleeves that are arranged in series, which can also have a corrugated area. However, these types of elements are expensive and cost-intensive to manufacture and cannot be repaired after an impact.

SUMMARY OF THE INVENTION

The windshield wiper device has the advantage that an attachable embodiment of the element produces the possibility of pedestrian impact protection for windshield wiper devices that is very cost-effective, efficient and simple to dimension. In addition, the attachability results in a particularly simple manufacture and repair of the windshield wiper device, making further cost savings possible in terms of assembly.

It is especially advantageous if the element is arranged in such a way that it is deformable, in particular compressible, with the effect of a force in the axial direction on the first end of the wiper shaft. In this way, the energy during an impact is absorbed especially well.

In a particularly simple and cost-effective design the element is arranged between the bearing housing and a projection on the wiper shaft.

In this case, it is especially advantageous if the projection is embodied to be disk-shaped and includes the wiper shaft so that the energy from the wiper shaft can be released on a very large area of the element.

In a simple variation of the embodiment the projection is embodied to be a single piece with the wiper shaft.

It is especially cost-effective if the element is embodied as a stamped/bent part or is made of coiled wire.

Especially little construction space is required if the element essentially fits snuggly around the wiper shaft.

Furthermore, it should be viewed as advantageous if the element is locked on the bearing housing, in particular via internal stress. As a result, it is possible to dispense completely with additional fastening elements.

The element is protected against corrosion, thereby decisively increasing the service life of the windshield wiper device.

Moreover, it is particularly advantageous if the bearing housing features safety means that protects the element from being twisted.

BRIEF DESCRIPTION OF THE DRAWINGS

One exemplary embodiment of the invention is depicted in the drawings and explained in more detail in the following description.

The drawings show:

FIGS. 6a, 6b An element of a windshield wiper device in accordance with the invention in a variation of FIG. 5a.

DETAILED DESCRIPTION

Figure 1:
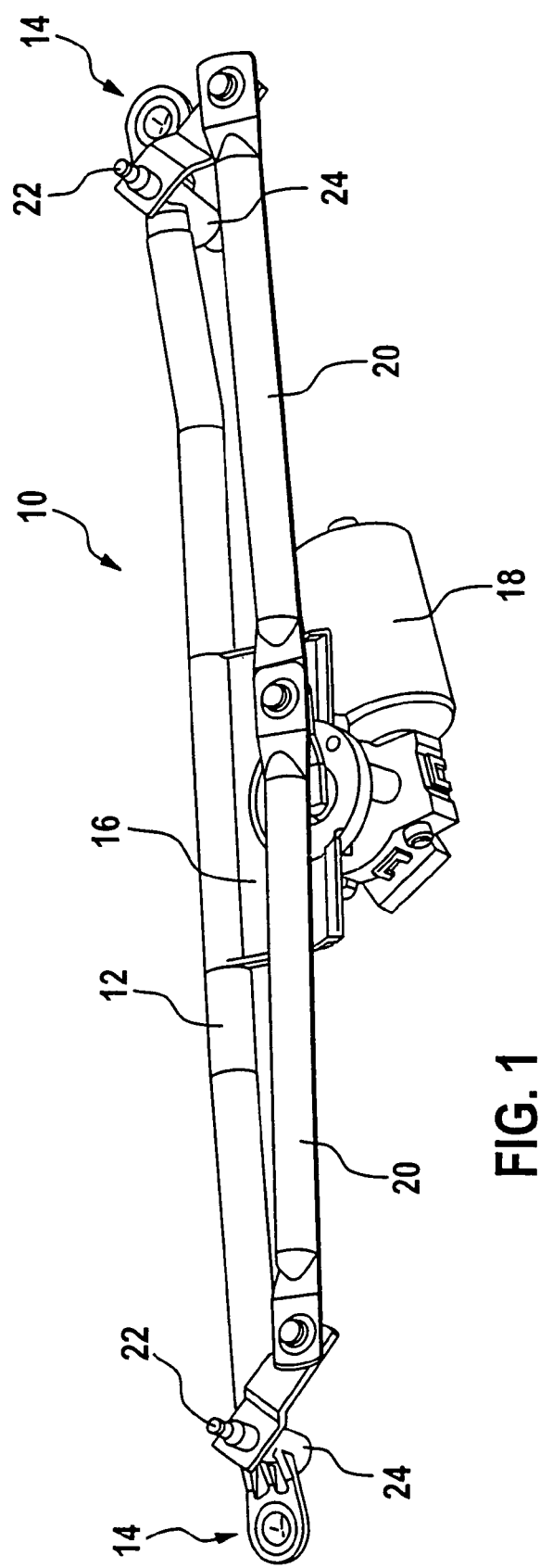
FIG. 1 A perspective representation of a windshield wiper device in accordance with the invention.

FIG. 1 shows a perspective representation of a windshield wiper device 10 in accordance with the invention. This is comprised essentially of a support tube 12, which bears a wiper bearing 14 on each of the ends of its longitudinal extension. In addition, a motor support 16 that bears a wiper motor 18 is fastened on the support tube 12. This wiper motor 18 drives wiper shafts 22, which are positioned in the bearing housings 24 of the wiper bearing 14, via thrust rods 20.

Figure 2:
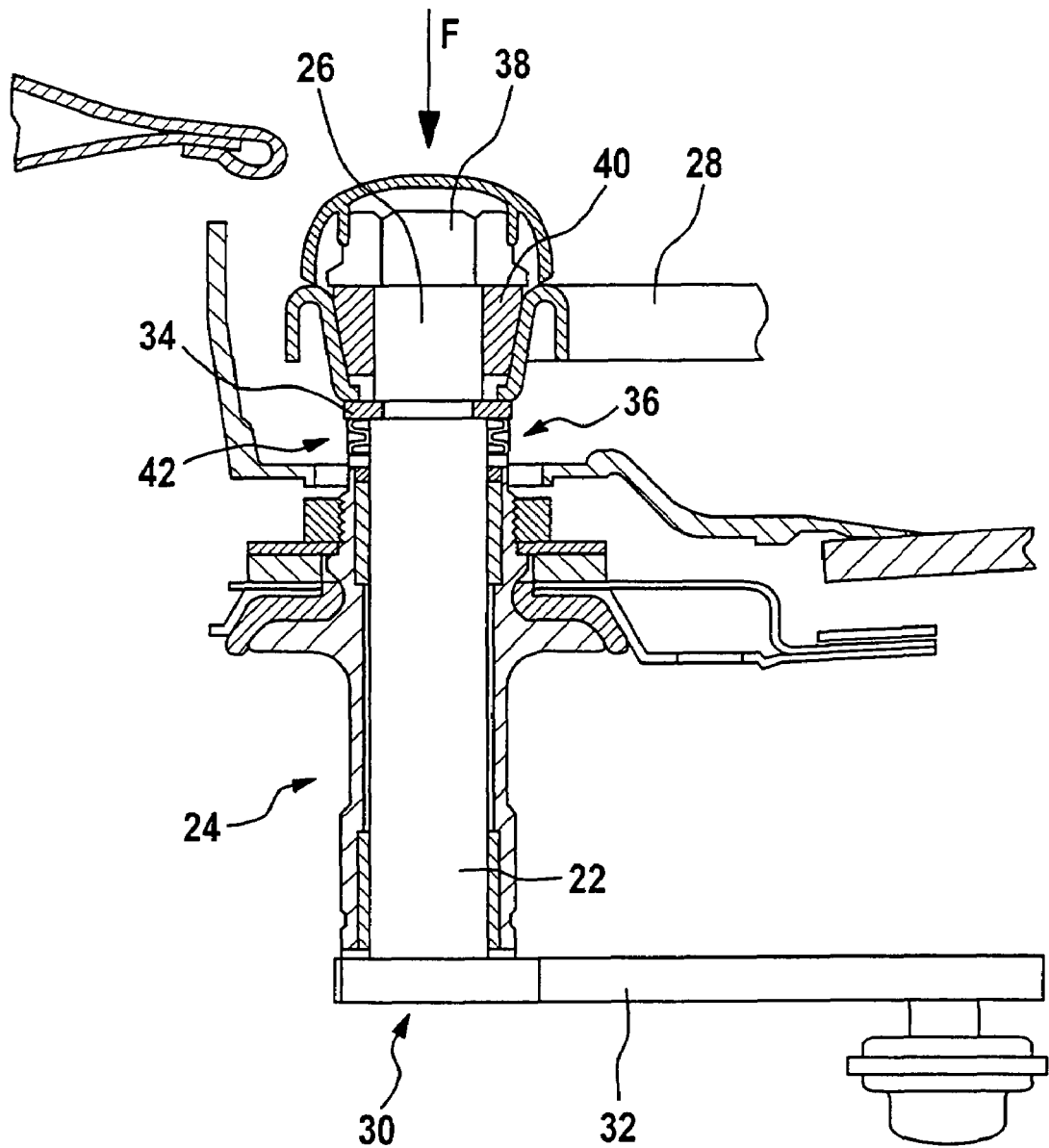
FIG. 2 A schematic section through a wiper bearing in accordance with the invention before the effect of force.

FIG. 2 depicts in detail a schematic cross-section of a wiper bearing of a windshield wiper device 10 in accordance with the invention.

The wiper shaft 22 is positioned in the bearing housing 24 of the wiper bearing 14. It has a first end 26, at which it is connected in a torque-proof manner with a wiper arm 28 that is shown only partially here. On the other end 30 of its longitudinal extension, the wiper shaft 22 is connected in a torque-proof manner with a drive crank 32, which is in turn connected in an articulated manner with the thrust rod 20 (FIG. 1). The wiper shaft 22 also features a projection 34, which is embodied as a disk and is fixed axially on the wiper shaft 22. The projection 34 can be embodied as a single piece with the wiper shaft 22 or can also be embodied as a slip-on disk, for example, which is fixed axially by means of a snap ring 35 in the direction of the wiper arm 28. In one variation, it is also conceivable that the projection 34 be composed at least partially of a circular recess into which a snap ring is inserted.

The wiper shaft 22 projects out of the front side 36 of the bearing housing 24 and features a thread on its first end 26, onto which the fastening element 38 that is embodied as a screw nut is screwed in order to fasten the wiper arm 28. Depending upon the embodiment of the wiper arm 28, an additional fastening piece 40 is also arranged between the fastening element 38 and the wiper arm 28.

An element 42 is arranged between the front side 36 of the bearing housing 24 and the projection 34 of the wiper shaft 22. This element 42 is attachable radially and laterally to the wiper shaft 22 and is embodied of stamped and bent sheet metal.

Figure 3:
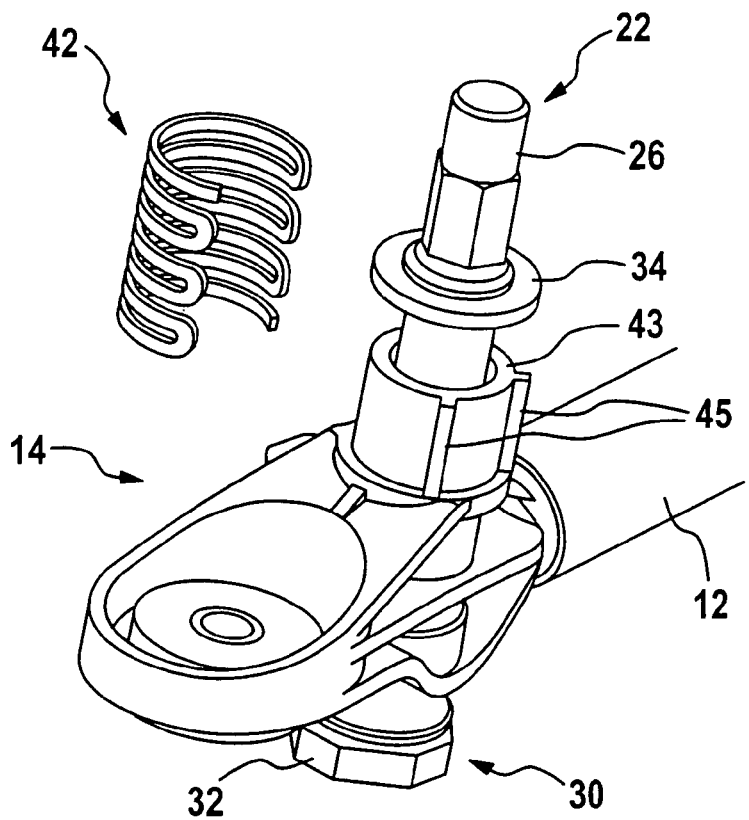
FIG. 3 A perspective representation of a wiper bearing of a windshield wiper conception in accordance with the invention as well as an element before it is fastened to the wiper bearing.

FIG. 3 shows a perspective representation of wiper bearing 14 on a support tube 12 of a windshield wiper device 10 in accordance with the invention. With its bearing housing 24, the wiper bearing 14 carries the wiper shaft 22, which can be connected on its first end 26 to a wiper arm (not shown). On its other end 30, the wiper shaft is connected in a torque-proof manner with the drive crank 32 so that it can be put into motion itself via the movement of the wiper motor 18. The wiper bearing 14 features a collar 43, which extends annularly around the wiper shaft 22 and serves to accommodate the element 42. To prevent the element 42 from rotating around the rotational axis of the wiper shaft 22, the collar 43 features two ribs 45 as safety means that are arranged in such a way that the radial play of the element 42, which is shown here in an exploded manner next to the wiper bearing 14, is inhibited or restricted.

The wiper shaft 22 features the projection 34 in the area if its first end 26, which supports itself in a mounted position on the element 42. In this case, the height of the collar 43 is selected so that it corresponds to the height of a compressed element 42. Therefore, this yields optimal positioning of the wiper shaft 22, on the one hand, and maximum utilization of the dampening path of the element 42, on the other. Naturally, the collar 43 can also have another suitable height; it should only be less than the height of the element 42. In a variation of the invention, the drive crank 32 itself can form the projection 34 by the drive crank 32 being arranged in the area of the first end 26 of the wiper shaft. In a further variation, the element can also be embodied as a single piece with the collar 43, or with the wiper bearing 14 or with the drive crank 32.

Figure 4:
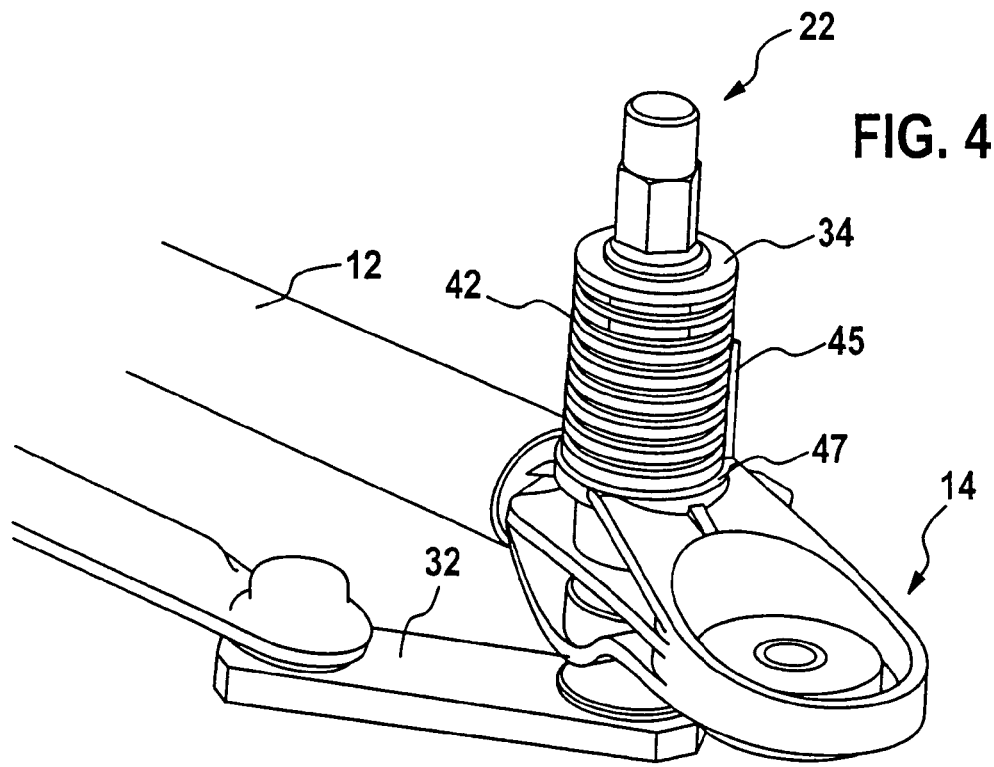
FIG. 4 A perspective representation of a wiper bearing of a windshield wiper device in accordance with the invention with a mounted element.

The support tube 12 with a wiper bearing 14 of a windshield wiper device 10 in accordance with the invention is depicted completely mounted in FIG. 4 together with the element 42.

The element 42 is placed laterally on the collar 43 of the wiper bearing 14 and fixed radially via the ribs 45. As a result, the element 42 grips around the collar 43 in a clamp-like manner. The element 42 is axially fixed, on the one hand, by the projection 34 of the wiper shaft 22, and, on the other hand, by the support 47 on the bearing housing 24 of the wiper bearing 14 itself. The support 47 is typically formed by fastening elements of the wiper bearing 14, or is embodied as a single piece with the wiper bearing.

Figure 5A:
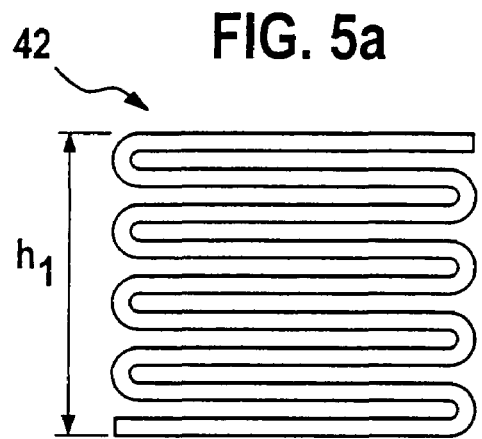
FIGS. 5a, 5b A schematic representation of an element of a windshield wiper device in accordance with the invention.
Figure 5B:
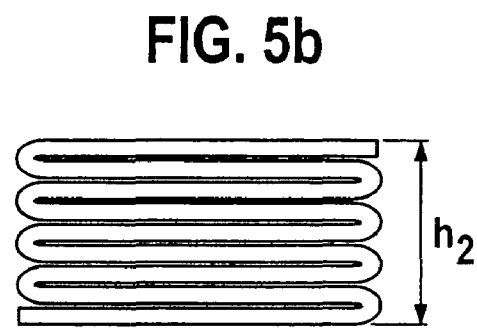
Figure 6A:
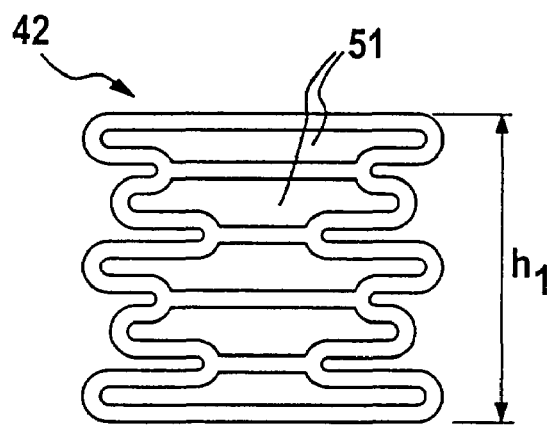
Figure 6B:
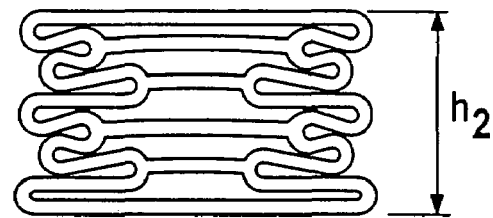

FIGS. 5*a*, 5*b* and 6*a*, 6*b* show different embodiments of an element 42 of a windshield wiper device 10 in accordance with the invention. For reasons of simplicity, in these figures the element 42 is shown not yet bent in a clamp-like manner, but still in an even, flat form, like what is typically found in the manufacturing process. FIG. 5*a* shows a simple element 42, which is bent from a stable wire. Alternating back-and-forth bending at specific intervals of the wire yields a meander-like structure with a spring-like character with the height h1 of element 42. FIG. 5*b* depicts the element from FIG. 5*a* in a compressed together position. The individual areas now fit directly and snugly together so that the element has height h2, which is typically less than height h1. This height h2 is typically also the height, which the collar 43 from FIG. 3 has. Of course, this type of shape can also be achieved by stamping. FIG. 6*a* depicts a variation of the element 42 from FIG. 5. The element 42 shown here is stamped out of sheet metal and/or punched so that closed hollow areas 51 form. The element 42 from FIG. 6*a* is depicted in a compressed manner in FIG. 6*b*.

As mentioned at the outset of the last paragraph, the elements 42 depicted in FIGS. 5*a*, 5*b* and 6*a*, 6*b* are still bent in a cylindrical manner around an axis, which lies in its deformation direction, in such a way that a slot or an opening still remains, with which the element 42 can be placed on the collar 43 of the bearing housing 24. In this sense, the elements 42 are not completely rotationally symmetrical. After being placed on the collar 43, the element 42 locks on the wiper bearing via its internal stress, similar to a snap ring. After a deformation, the element 42 can also be removed again very easily from the wiper bearing 14 in this manner and replaced by a new element without the windshield wiper device 10 having to be dismantled. Optimal energy absorption of the element 42 is achieved by a complete utilization of the space between the stopping face 47 and the projection 34. The elements 42 shown in FIGS. 6*a*, 6*b* can be manufactured very easily by stamping from a sheet metal strip, which can then also still be bent following this. In this way, a defined rigidity can also be adjusted in a simple manner. In a variation, the element 42 must naturally not only be bent cylindrical, but can also be suitably bent elliptically or in another way. These types of elements 42 can be manufactured most simply using transfer presses or in follow-on composite tools. The element 42 is preferably embodied of steel material with corrosion protection, e.g., hot galvanizing, but can also be embodied of zinc or aluminum sheet, of plastic or of a ceramic. If the element 42 is coiled out of wire, it is possible to immediately produce the final geometry, i.e., the cylindrical geometry, in one manufacturing step.

The invention claimed is:

1. Windshield wiper device (10), with at least one wiper bearing (14), which includes a bearing housing (24), a wiper shaft (22), which is positioned in the bearing housing (24) and bears a wiper arm (28) on a first end (26), and an element (42), which axially fixes the wiper shaft (22), characterized in that the element (42) defines a radial opening such that the element (42) is radially attachable to the wiper shaft (22) or the bearing housing (24), and in that the element (42) is axially compressible with the effect of a force (F) in the axial direction on the first end (26) of the wiper shaft (22) thereby enabling axial movement of the shaft into the housing.

2. Windshield wiper device (10) according to claim 1, characterized in that the wiper shaft (22) features a projection (34) and the element (42) is arranged between the bearing housing (24) and the projection (34).

3. Windshield wiper device (10) according to claim 2, characterized in that the projection (34) is embodied to be disk-shaped and includes the wiper shaft (22).

4. Windshield wiper device (10) according to claim 2, characterized in that the projection (34) is embodied to be a single piece with the wiper shaft (22).

5. Windshield wiper device (10) according to claim 1, characterized in that the element (42) is one of a stamped part, a bent part and coiled wire.

6. Windshield wiper device (10) according to claim 5, characterized in that the element (42) includes a circumferentially-extending first leg having a first end, a second end and an intermediate portion between the first end and the second end, and a circumferentially-extending second leg having a first end, a second end and an intermediate portion between the first end and the second end, the first leg being axially spaced from the second leg, the intermediate portion of the first leg being separate from the intermediate portion of the second leg such that an opening is defined between the intermediate portion of the first leg and the intermediate portion of the second leg, one end of the first leg being connected to one end of the second leg, when the element (42) is compressed, the first leg being axially movable toward to the second leg thereby decreasing a size of the opening between the intermediate portion of the first leg and the intermediate portion of the second leg.

7. Windshield wiper device (10) according to claim 6, characterized in that the element (42) is a stamped part providing the first leg and the second leg.

8. Windshield wiper device (10) according to claim 6, characterized in that the element (42) is a bent part providing the first leg and the second leg.

9. Windshield wiper device (10) according to claim 6, characterized in that the element (42) is coiled wire providing the first leg and the second leg.

10. Windshield wiper device (10) according to claim 1, characterized in that the element (42) extends around a circumference of the wiper shaft (22) by more than 180 degrees, in particular by more than 220 degrees, preferably by more than 270 degrees.

11. Windshield wiper device (10) according to claim 1, characterized in that the element (42) is locked on the bearing housing (24) or on the wiper shaft (22), in particular via internal stress.

12. Windshield wiper device (10) according to claim 1, characterized in that the element (42) is protected against corrosion, in particular is hot galvanized.

13. Windshield wiper device (10) according to claim 1, characterized in that the bearing housing (24) features safety means (45) that keep the element (42) from being twisted.

14. Windshield wiper device (10) according to claim 13, characterized in that the element (42) includes, on at least one circumferential side of the radial opening, an axially-extending, circumferentially-facing end surface portion, and in that the safety means (45) includes an axially-extending radial rib (45) circumferentially engageable with the end surface portion of the element (42) to inhibit movement of the element (42) about the wiper shaft (22) or the bearing housing (24).

15. Windshield wiper device (10) according to claim 14, characterized in that a collar (43) supports the rib (45), the collar (43) being provided by the bearing (14), the collar (43) having a height less than a height of the element (42) when the element (42) is not compressed.

16. Windshield wiper device (10) according to claim 14, characterized in that the element (42) includes, on opposite circumferential sides of the radial opening, respective axially-extending, circumferentially-facing end surface portions, and the safety means (45) includes a pair of axially-extending radial ribs (45), each rib (45) being circumferentially engageable with an associated end surface portion of the element (42) to inhibit movement of the element (42) about the wiper shaft (22) or the bearing housing (24).

17. Windshield wiper device (10), with at least one wiper bearing (14), which includes a bearing housing (24), a wiper shaft (22), which is positioned in the bearing housing (24) and bears a wiper arm (28) on a first end (26), and an element (42), which axially fixes the wiper shaft (22), characterized in that the element (42) defines a radial opening such that the element (42) is radially attachable to one of the wiper shaft (22) and the bearing housing (24), the element (42) including, on at least one circumferential side of the radial opening, an axially-extending, circumferentially-facing end surface portion, the element (42) being deformable with the effect of a force (F) in the axial direction on the first end (26) of the wiper shaft (22) thereby enabling axial movement of the shaft into the housing, and characterized in that the bearing housing includes an axially-extending radial rib (45) circumferentially engageable with the end surface portion of the element (42) to inhibit movement of the element (42) about the wiper shaft (22) or the bearing housing (24).

18. Windshield wiper device (10) according to claim 17, characterized in that, on opposite circumferential sides of the radial opening, the element (42) includes respective axially-extending, circumferentially-facing end surface portions, and the safety means (45) includes a pair of axially-extending radial ribs (45), each rib (45) being circumferentially engageable with an associated end surface portion of the element (42) to inhibit movement of the element (42) about the wiper shaft (22) or the bearing housing (24).

19. Windshield wiper device (10) according to claim 17, characterized in that the element (42) is axially compressible with the effect of a force (F) in the axial direction on the first end (26) of the wiper shaft (22).

* * * * *

UNITED STATES PATENT AND TRADEMARK OFFICE
CERTIFICATE OF CORRECTION

PATENT NO.       : 7,581,278 B2                           Page 1 of 1
APPLICATION NO.  : 10/536059
DATED            : September 1, 2009
INVENTOR(S)      : Joachim Zimmer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Fourteenth Day of September, 2010

David J. Kappos
*Director of the United States Patent and Trademark Office*